US012415102B2

(12) United States Patent
Prevot et al.

(10) Patent No.: US 12,415,102 B2

(45) Date of Patent: Sep. 16, 2025

(54) MOUNTING DEVICE FOR A FALL PROTECTION DEVICE AND METHODS OF USING THE SAME

(71) Applicant: HONEYWELL SAFETY PRODUCTS USA, INC., Charlotte, NC (US)

(72) Inventors: Tanguy Prevot, Nebovidy (CZ); Jan Hrouzek, Damborice (CZ); Jan Riha, Brno (CZ); Miroslav Molinek, Havirov (CZ)

( * ) Notice: Subject to any disclaimer, the term of this patent is extended or adjusted under 35 U.S.C. 154(b) by 0 days.

(21) Appl. No.: 18/669,409

(22) Filed: May 20, 2024

(65) Prior Publication Data

US 2024/0299783 A1 Sep. 12, 2024

Related U.S. Application Data

(63) Continuation of application No. 17/813,869, filed on Jul. 20, 2022, now Pat. No. 12,070,635.

(51) Int. Cl.
*A62B 35/00* (2006.01)

(52) U.S. Cl.
CPC ................................ *A62B 35/0068* (2013.01)

(58) Field of Classification Search
CPC ............ A62B 35/0068; A62B 35/0075; A62B 35/0093; A62B 35/0025
See application file for complete search history.

(56) References Cited

U.S. PATENT DOCUMENTS 4,942,943 A 7/1990 Flaherty
11,459,780 B2 * 10/2022 Martin Iglesias ... E04G 21/3261
(Continued)

FOREIGN PATENT DOCUMENTS

CN 202822515 U 3/2013
CN 113508426 A 10/2021
(Continued)

OTHER PUBLICATIONS

Capital Safety, "Standing Seam Swiveling Roof Anchor", Protecta Product Sheet, 2 pages, 2011.
(Continued)

*Primary Examiner* — Amy J. Sterling
(74) *Attorney, Agent, or Firm* — Fredrikson & Byron, P.A.

(57) ABSTRACT

Various embodiments are directed to mounting devices for fall protection devices and methods of using the same. In various embodiments, a mounting device may comprise a mounting bracket configured for attachment to a materials handling vehicle; a rotary arm rotatably attached to the mounting bracket at an arm base, wherein the rotary arm is configured to rotate relative to the mounting bracket about an axis of rotation defined at the arm base, and wherein the rotary arm defines a webbing retention feature configured for receiving a webbing of a fall protection device to define a dynamic engagement of the rotary arm with an intermediate webbing portion defined along the webbing; a sensing device configured to capture sensor data associated with the intermediate webbing portion; and a controller configured to (Continued)

detect a connection condition associated with the fall protection device based on the sensor data captured by the sensing device.

18 Claims, 5 Drawing Sheets

(56) References Cited

U.S. PATENT DOCUMENTS

| | | | |
|---|---|---|---|
| 12,102,851 B2* | 10/2024 | Strauss | A62B 35/0068 |
| 2012/0325586 A1 | 12/2012 | Meggs et al. | |
| 2013/0146699 A1 | 6/2013 | O'Brien et al. | |
| 2015/0375020 A1 | 12/2015 | Palet | |
| 2017/0368387 A1 | 12/2017 | Fife et al. | |
| 2018/0126198 A1 | 5/2018 | Troy et al. | |
| 2020/0096952 A1 | 3/2020 | Hu et al. | |
| 2022/0134149 A1 | 5/2022 | Carlson et al. | |
| 2022/0195742 A1 | 6/2022 | Fife | |
| 2023/0127292 A1 | 4/2023 | Palet | |

FOREIGN PATENT DOCUMENTS

| | | |
|---|---|---|
| JP | 2002-104776 A | 4/2002 |
| JP | 2005-061106 A | 3/2005 |
| JP | 2019-188009 A | 10/2019 |
| WO | 2020/194121 A1 | 10/2020 |
| WO | 2021/099874 A1 | 5/2021 |

OTHER PUBLICATIONS

English Translation of JP Notice of Allowance, including Search Report dated Oct. 16, 2024 for JP Application No. 2023117538, 3 page(s).
Extended European Search Report Mailed on Nov. 28, 2023 for EP Application No. 23185247, 9 page(s).
Harness Land, "Standing Seam Roof Anchor Clamp", 3 pages, retrieved from the Internet at <URL: https://www.harnessland.com/Standing-Seam-Roof-Anchor-p/00250.htm> on Jan. 11, 2023.
Honeywell, "Miller DuraHoistTM Safety Systems", 8 pages, 2017.
JP Notice of Allowance, including Search Report Mailed on Oct. 16, 2024 for JP Application No. 2023117538, 3 page(s).
JP Office Action Mailed on May 2, 2024 for JP Application No. 2023117538, 7 page(s).
Non-Final Rejection Mailed on Oct. 17, 2023 for U.S. Appl. No. 17/813,869, 9 page(s).
Notice of Allowance and Fees Due (PTOL-85) Mailed on Mar. 13, 2024 for U.S. Appl. No. 17/813,869, 7 page(s).
U.S. Appl. No. 17/813,869, filed Jul. 20, 2022, U.S. Pat. No. 12,070,635, Patented.

* cited by examiner

MOUNTING DEVICE FOR A FALL PROTECTION DEVICE AND METHODS OF USING THE SAME

CROSS-REFERENCE TO RELATED APPLICATIONS

This application is a continuation of U.S. Non-Provisional application Ser. No. 17/813,869, entitled "MOUNTING DEVICE FOR A FALL PROTECTION DEVICE AND METHODS OF USING THE SAME" and filed on Jul. 20, 2022, which is incorporated herein by reference in its entirety.

FIELD OF THE INVENTION

Various embodiments described herein relate generally to safety equipment or personal protective equipment (PPE), including mounting devices and fall protection devices used by operators within a materials handling environment during operation of various materials handling vehicles capable of operating at an elevated height.

BACKGROUND

Generally, in material handling environments like, but not limited to, high volume distribution and fulfillment operations, materials handling vehicles can be used to retrieve objects from various storage locations defined at elevated heights. Fall protection equipment may be utilized by an operator of a materials handling vehicle to minimize risk of falling from the elevated height during operation of a materials handling vehicles. Applicant has identified several technical challenges associated with utilizing fall protection devices during operation of materials handling vehicles and other associated systems and methods. Through applied effort, ingenuity, and innovation, many of these identified challenges have been overcome by developing solutions that are included in embodiments of the present invention, many examples of which are described in detail herein.

BRIEF SUMMARY

Various embodiments are directed to a mounting device for a fall protection device and methods of using the same. In various embodiments, a mounting device may comprise a mounting bracket configured for attachment to a materials handling vehicle; a rotary arm rotatably attached to the mounting bracket at an arm base, wherein the rotary arm is configured to rotate relative to the mounting bracket about an axis of rotation defined at the arm base, and wherein the rotary arm defines a webbing retention feature configured for receiving a webbing of a fall protection device to define a dynamic engagement of the rotary arm with an intermediate webbing portion defined along a length of the webbing; a first sensing device configured to capture first sensor data associated with the intermediate webbing portion; and a controller configured to detect a connection condition associated with the fall protection device based at least in part on the first sensor data captured by the first sensing device.

In various embodiments, the webbing retention feature may define an extended webbing engagement point at which the rotary arm is configured to contact the intermediate webbing portion to at least partially define an arrangement of the webbing relative to the mounting device. In certain embodiments, the rotary arm may comprise an extension arm that is rigidly secured to the arm base at a proximal arm end, the extension arm defining an arm length that extends from the proximal arm end in an outward radial direction to a distal arm end, wherein the outward radial direction being defined relative to the axis of rotation. In certain embodiments, the webbing retention feature may define at a distal position along the extension arm, and wherein a rotation of the rotary arm about the axis of rotation causes a corresponding rotation of the extended webbing engagement point about the axis of rotation such that rotary arm is configured to facilitate an extended range of motion for an operator relative to the fall protection device. In various embodiments, the rotary arm may be configured for coupling with the fall protection device such that a body of the fall protection is secured relative to the rotary arm, the rotary arm being configured for engagement with the fall protection device such that a rotation of the rotary arm about the axis of rotation causes a corresponding rotation of the fall protection device through a corresponding range of rotational motion. In certain embodiments, the axis of rotation may be defined by a central axis of the arm base, and wherein the rotary arm is configured for securing the body of the fall protection device relative to the arm base of the rotary arm such that the axis of rotation is defined at both the arm base and the fall protection device secured thereto.

In various embodiments, the webbing retention feature may define an opening configured for the webbing of the fall protection device to be threaded therethrough such that at least a portion of the intermediate webbing portion is disposed within the opening. In various embodiments, the rotary arm may be rotatably attached to an arm interface portion of the mounting bracket defining a downward-facing bottom surface such that the rotary arm is configured to define a position vertically below the mounting bracket upon the mounting bracket being secured relative to the materials handling vehicle, and wherein the axis of rotation is defined in a direction at least substantially perpendicular to the downward-facing bottom surface. In various embodiments, the rotary arm may be rotatably attached to the mounting bracket via one or more fastening elements comprising a slip ring. In various embodiments, the first sensor data captured by the first sensing device may be configured to facilitate a detection of a movement condition defined by one or more movements of the intermediate webbing portion relative to the webbing retention feature. In certain embodiments, the first sensing device may comprise an imaging device and the first sensor data is defined by imaging data comprising at least one image of the intermediate webbing portion. In certain embodiments, the first sensing device may be positioned at the webbing retention feature.

In various embodiments, the mounting device may further comprise a second sensing device configured to capture second sensor data to facilitate a detection of a movement condition of the mounting device. In various embodiments, the second sensor data captured by the second sensing device may correspond at least in part to a movement of one or more of the mounting bracket and the rotary arm, and wherein the controller is configured to detect the movement condition of the mounting device based at least in part on the second sensor data captured by the second sensing device. In certain embodiments, the second sensor data may be positioned relative to the mounting bracket such that the second sensor data captured by the second sensing device corresponds to one or more of a linear movement of the mounting bracket and a rotational movement of the rotary arm. In certain embodiments, the second sensing device may comprise a motion-sensing device comprising a gyroscope and an accelerometer, the motion-sensing device being configured to execute a six-degrees-of-freedom motion-sensing operation.

In various embodiments, the connection condition associated with the fall protection device may be defined by a detection of a connected configuration of the fall protection device relative to an operator attachment operatively secured to an operator. In various embodiments, the controller may be configured to detect the connected configuration associated with fall protection device based on a detected first movement condition defined by the intermediate webbing portion disposed at the webbing retention feature. In certain embodiments, the controller may be configured to detect the connected configuration associated with fall protection device further based on a detected second movement condition defined by a detected movement of the mounting device. Further, in certain embodiments, the controller may be configured to detect the connected configuration associated with fall protection device further based on a drive signal received by the controller, the drive signal corresponding to a user-initiated operation of the materials handling vehicle.

BRIEF DESCRIPTION OF THE DRAWINGS

Reference will now be made to the accompanying drawings, which are not necessarily drawn to scale, and wherein.

DETAILED DESCRIPTION

Figure 1:
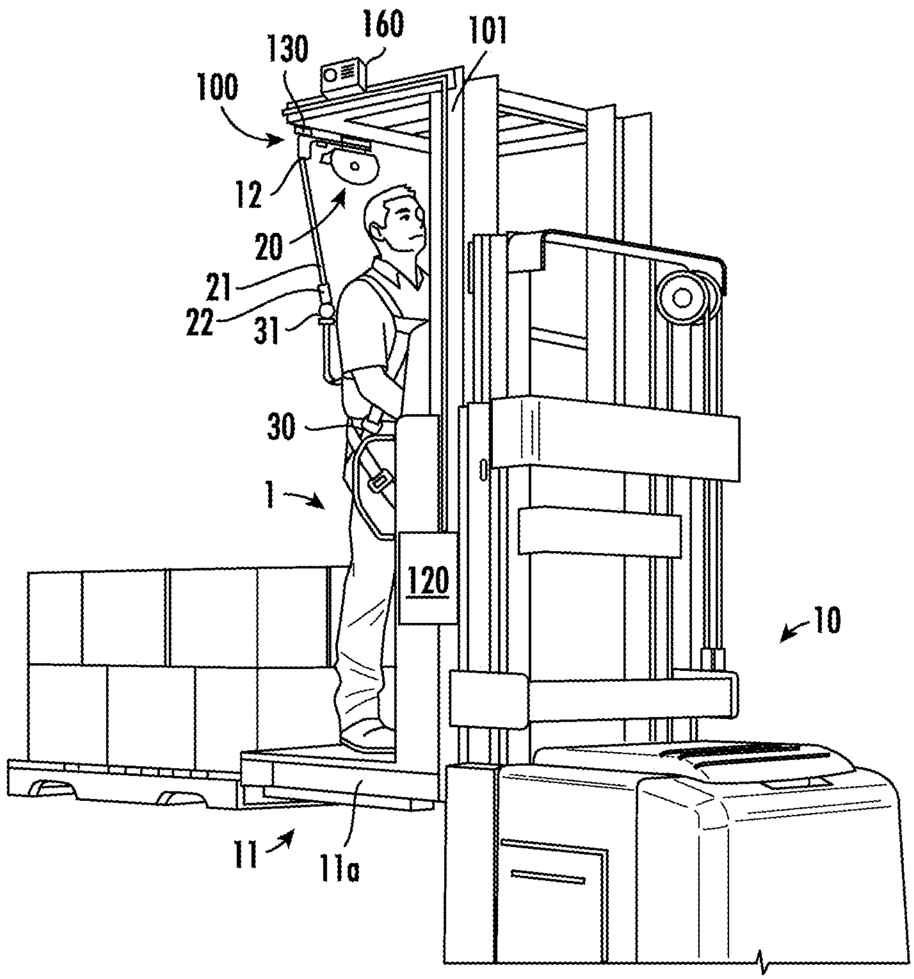
FIG. 1 illustrates a perspective view of a materials handling vehicle and an exemplary mounting device associated with fall protection equipment according to an example embodiment described herein.

The present disclosure more fully describes various embodiments with reference to the accompanying drawings. It should be understood that some, but not all embodiments are shown and described herein. Indeed, the embodiments may take many different forms, and accordingly this disclosure should not be construed as limited to the embodiments set forth herein. Rather, these embodiments are provided so that this disclosure will satisfy applicable legal requirements. Like numbers refer to like elements throughout.

It should be understood at the outset that although illustrative implementations of one or more aspects are illustrated below, the disclosed assemblies, systems, and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents. While values for dimensions of various elements are disclosed, the drawings may not be to scale.

The words "example," or "exemplary," when used herein, are intended to mean "serving as an example, instance, or illustration." Any implementation described herein as an "example" or "exemplary embodiment" is not necessarily preferred or advantageous over other implementations.

Picking or workstations are essential components of high volume distribution and fulfillment operations. Conventionally, order picking requires an order picker to take an order list, walk through racks of products filled with containers of products to pick from, picking the listed products from product containers, and placing the picked products into an order container for delivery to packaging. However, this solution is slow and requires intensive manpower. Thus, automated picking or workstations are used in more recent systems. For example, various materials handling vehicles comprising order pickers may be configured to move throughout a materials handling environment, a storage environment, and/or the like to retrieve objects from storage locations defined at various heights. Where such materials handling vehicles can be configured to raise a platform upon which an operator stands in an operating position during operation of the vehicle to an elevated height corresponding to the storage location, various industry safety standards have been developed that require the use of fall protection equipment configured to facilitate a secured connection of the operator (e.g., a harness being worn by the operator) to an anchored fastener on the materials handling vehicle. Often, however, installing the fall protection equipment in a fully installed configuration relative to both the operator and the picker may be a cumbersome process for an operator that requires the operator to spend time executing a number of installation steps prior to operating the picker, which may represent a costly loss of operation time in high volume distribution and fulfillment operations. As such, picker operators frequently forego using the required fall protection equipment, which can create an extremely dangerous operating condition with a high risk of serious operator injury, and may result in industry sanctions, regulatory punishments, and/or monetary damages based on a lack of compliance with established safety standards.

Various embodiments described herein are directed to mounting devices for securing a fall protection device relative to a materials handling vehicle that utilizes captured sensor data to determine whether the fall protection device is properly installed in a connected configuration relative to an operator during operation of the materials handling vehicle. As described herein, the present invention includes a mounting bracket configured for attachment to a materials handling vehicle and a rotary arm rotatably attached to the mounting bracket that is configured for coupling with the fall protection device in order to secure the fall protection device relative to the mounting device. The rotary arm of the present invention defines a webbing retention element at a distal end thereof that at which the rotary arm is configured to receive a portion of the webbing connecting the body of the fall protection device to an operator standing therebelow. Accordingly, the mounting device is configured such that a rotation of the rotary arm enables an extended range of motion for the operator as the operator moves relative to the mounted body of the fall protection device throughout the workspace. Further, the engagement of the webbing of the fall protection device with the rotary arm, as described herein, causes the drag forces present within the webbing during operator movement to be at least substantially minimized such that the operator experiences a minimal amount of resistance from the fall protection device that is anchoring the operator to the mounting device.

Further, the present invention includes a sensing devices configured to capture sensor data associated with the movement the mounting device within an environment and the movement (e.g., micro-movement) of the webbing portion engaged with the rotary arm relative to the webbing retention feature. The mounting device incudes a controller configured to detect a connection condition associated with the fall protection device based at least in part on the sensor data captured by the sensing device(s).

Accordingly, as described herein, the present invention promotes user comfort and ease-of accessibility throughout a workspace defined relative to a materials handling vehicle, while drastically reducing the risk of a materials handling vehicle being deliberately and/or unintentionally operated in a dangerous and/or non-compliant manner.

FIG. 1 illustrates a perspective view of a materials handling vehicle having an exemplary mounting device for detecting a connection condition associated with fall protection device. In particular, FIG. 1 illustrates a perspective view of an exemplary mounting device for a fall protection device configured for operatively connecting a fall protection device to a materials handling vehicle and detecting a connection condition associated with the fall protection device relative to an operator coupling element (e.g., at an operator-worn harness). For example, an exemplary mounting device may be configured to detect whether a fall protection device connected thereto is installed in a fully installed configuration relative to an operator coupling element to determine whether an operator present within a workspace defined by the materials handling vehicle is sufficiently secured to the fall protection device during operation of the materials handling vehicle.

In various embodiments, for example, a mounting device 100 may be configured to detect a connection condition associated with a fall protection device 20 configured for use within a workspace defined by a materials handling vehicle 10. For example, a materials handling vehicle 10, such as, for example, an order picker, may be used by a human operator 1 within a materials handling environment (e.g., a storage warehouse) to facilitate the retrieval and/or storage of an object to and/or from a storage location located at an elevated height above the ground floor. An exemplary materials handling vehicle 10 may comprise a lift configured to be selectively moveable in a vertical direction to a plurality of vertical heights in order to facilitate the storage and/or retrieval of an object from an elevated storage location. The lift of the materials handling vehicle 10 may comprise a lift platform 11*a* upon which an operator 1 may stand as the lift is moved between various vertical heights in order to enable the operator to assist in the storage and/or retrieval operation from the elevated storage location. In various embodiments, the materials handling vehicle 10 comprises a workstation 11 at which the operator 1 may stand in an operating position in order to operate (e.g., drive, lift, and/or otherwise control) the materials handling vehicle 10. In various embodiments, as illustrated, the workstation 11 of the materials handling vehicle 10 may be defined on the lift platform 11*a*, such that the operating position of the materials handling vehicle 10 is defined by the operator 1 standing on the lift platform 11*a* in a front-facing position towards the vehicle operation controls (e.g., user controls accessible to an operator 1 standing in the operating position that are configured to facilitate operation of the drive assembly and the lift assembly of the materials handling vehicle 10).

To maintain compliance with various safety standards, protocols, and/or the like designed mitigate the risk of personal injury associated with an operator working at an elevated height, an operator 1 may use one or more items of personal protective equipment (PPE) defining fall protection equipment (FPE), such as, for example, a fall protection device 20 and a wearable harness 30. In various embodiments, a fall protection device 20 (e.g., a personal fall limiter) may be used to operably secure an operator 1 wearing a harness 30 relative to one or more anchors points. For example, as illustrated, a fall protection device 20 may be configured to operably attach the operator 1 to an exemplary mounting device 100 that is secured to an upper frame element 12 (e.g., a rail, a beam, and/or the like) of the materials handling vehicle 10 that positioned above the workspace 11 defined by the materials handling vehicle 10, such as, for example, on a top portion of the lift that is configured to move vertically with the platform 11*a* such that both the upper frame element 12 and the mounting device 100 secured thereto maintain a position above the operator 1 throughout operation of the materials handling vehicle 10.

An exemplary mounting device 100 may be configured to receive a fall protection device 20 such that the fall protection device 20 may be coupled to the mounting device 100 to facilitate the mounting of the fall protection device 20 relative to the upper frame element 12 of the materials handling vehicle 10. For example, the mounting device 100 may be configured to facilitate the anchoring of an operator 1 relative to the upper frame element 12 of the materials handling vehicle 10 via the fall protection device 20 that is mounted to the mounting device 100. As an illustrative example, FIG. 1 shows an exemplary fall protection device 20 mounted to an exemplary mounting device 100 and in an installed configuration relative to an operator harness 30 (e.g., an operator attachment 31) being worn by an operator 1 standing in an operating position. In various embodiments, the installed configuration of a fall protection device 20 that is mounted to an exemplary mounting device 100 may be defined by a connection of the attachment element 22 of the fall protection device 20 to the operator attachment 31 of the harness 30.

It should be understood that many types and configurations of safety/fall harnesses are known in the PPE and FPE industry, including full body harnesses and partial or hip/waist fall harnesses, all, or most, of which are suitable for use with the concepts disclosed herein. Accordingly, the wearable safety harness 30 depicted in FIG. 1 is provided for purposes of illustration and further specific details of the harness 30 will not be discussed herein except for those required for an understanding of the disclosed concepts, and that the appended claims are not limited to any specific details of a harness unless expressly recited in the claims.

In various embodiments, a mounting device may be installed at materials handling vehicle relative to a workspace and configured to detect a connection condition defined at least in part by a connection of a fall protection device relative to an operator (e.g., an operator attachment of a wearable harness). For example, as illustrated in FIG. 1, an exemplary mounting device 100 may be installed at an upper frame element 12 of an exemplary materials handling vehicle 10 and configured to detect a connection condition of a fall protection device 20 relative to an operator 1 present within the workspace 11, wherein the connection condition is defined at least in part by the connected configuration of the attachment element 22 of the fall protection device 20 mounted to the mounting device 100 relative to an operator attachment 31 defined by a wearable harness 30 being worn by the operator 1. In various embodiments, the operator attachment 31 may comprise a safety component secured relative to the harness 30 and configured for coupling to an attachment element 22 of the fall protection device 20, such as, for example a D-ring, a carabiner, and/or any other applicable fastening means attached to a distal end of the webbing 21 of the fall protection device 20. As a non-limiting example, the mounting device 100 may be configured to detect a safe operating condition based at least in part on a determination that the fall protection device 20 defines a connected condition defined by a connected configuration of the fall protection device 20 (e.g., the attachment element 22) relative to the operator attachment 31, as described herein.

In various embodiments, one or more of the first and second sensing devices 130, 150 may be electronically connected to the controller 140 of the mounting device 100 by circuitry 101. For example, the controller 140 may be electrically connected to a power source and/or one or more internal circuitries of the materials handling vehicle, so as to enable distribution of power through the controller 140 to the components of the mounting device 100 in communication therewith, such as, for example, one or more of the first and second sensing devices 130, 150 and/or the connection condition indicator 160. Alternatively, or additionally, the one or more of the first and second sensing devices 130, 150 may be electrically connected to the power circuitry 101 of the materials handling vehicle 10 such that the sensing devices 130, 150 may be powered by a power signal supplied by the power supply of the materials handling vehicle 10. As described herein, in various embodiments, the first sensing device 130 may be configured to transmit at least a portion of the imaging data captured by the first sensing device 130 to the controller 140 via the electronic communication defined therebetween. Further, as described herein, in various embodiments, the second sensing device 150 may be configured to transmit at least a portion of the device movement data captured by the second sensing device 150 to the controller 140 via the electronic communication defined therebetween.

In various embodiments, an exemplary controller 140 may be in electronically connected to the first sensing device 130 and/or a second sensing device 150 of the mounting device 100 such that the controller 140 is configured to receive captured sensor data from the first and/or second sensing device 130, 150 and, based at least on part on the captured sensor data, detect a connection condition associated with the fall protection device 20 relative to an operator attachment 31 defined by the wearable harness 30 being worn by an operator 1. For example, the controller 140 may be in electronically connected to the first sensing device 130 (e.g., an imaging device) such that the controller 140 may receive the captured imaging data from the imaging device 130 and, based at least on part on the captured imaging data, detect a movement condition and/or a stationary condition defined by the webbing 21 of the fall protection device 20. As a further example, the controller 140 may be in electronically connected to the second sensing device 150 (e.g., a motion-sensing device) such that the controller 140 may receive the captured device movement data from the second sensing device 150 and, based at least on part on the captured device movement data, detect a movement condition defined by the mounting device 100 (e.g., defined by the mounting bracket 110 and/or the rotary arm 120). As described in further detail herein, the controller 140 may be configured to detect a connection condition associated with the fall protection device 20, such as, for example, a connected configuration defined by a connection of an attachment element 22 to an operator attachment (e.g., defined by a wearable harness 30), and a disconnected configuration defined by the attachment element 22 not being secured relative to the operator attachment (e.g., defined by a wearable harness 30), based at least in part on the sensor data (e.g., imaging data, device movement data) received from first and second sensing devices 130, 150 of the mounting device 100.

Further, in various embodiments, the mounting device 100 may further comprise a connection condition indicator 160 configured to receive one or more signals corresponding to the detected connection condition from the controller 140 and transmit at least one indication thereof, such as, for example, an audio indication signal, a visual indication signal, and/or any other appropriate signal that may be transmitted by the connection condition indicator 160 and perceived by the operator 1 and/or another party (e.g., a nearby worker, a manager, a safety coworker). In various embodiments, a connection condition indicator 160 may comprise one or more LEDs configured to be selectively operated based at least in part on an indicator signal received by the connection condition indicator 160 from the controller 140. For example, the connection condition indicator 160 may comprise a plurality of LEDs, each being configured to selectively powered to cause an alert signal comprising a visual signal (e.g., an emitted light) that that corresponds to a particular connection condition to be transmitted from the connection condition indicator 160. Further, in various embodiments, the connection condition indicator 160 may be configured to transmit an alert signal comprising a perceivable audio signal (e.g., via an integrated a speaker component and/or the like) that is configured to emit a predetermined sound, instructional message, and/or the like, or any combination thereof that corresponds to the connection condition detected by the controller 140.

Figure 2A:
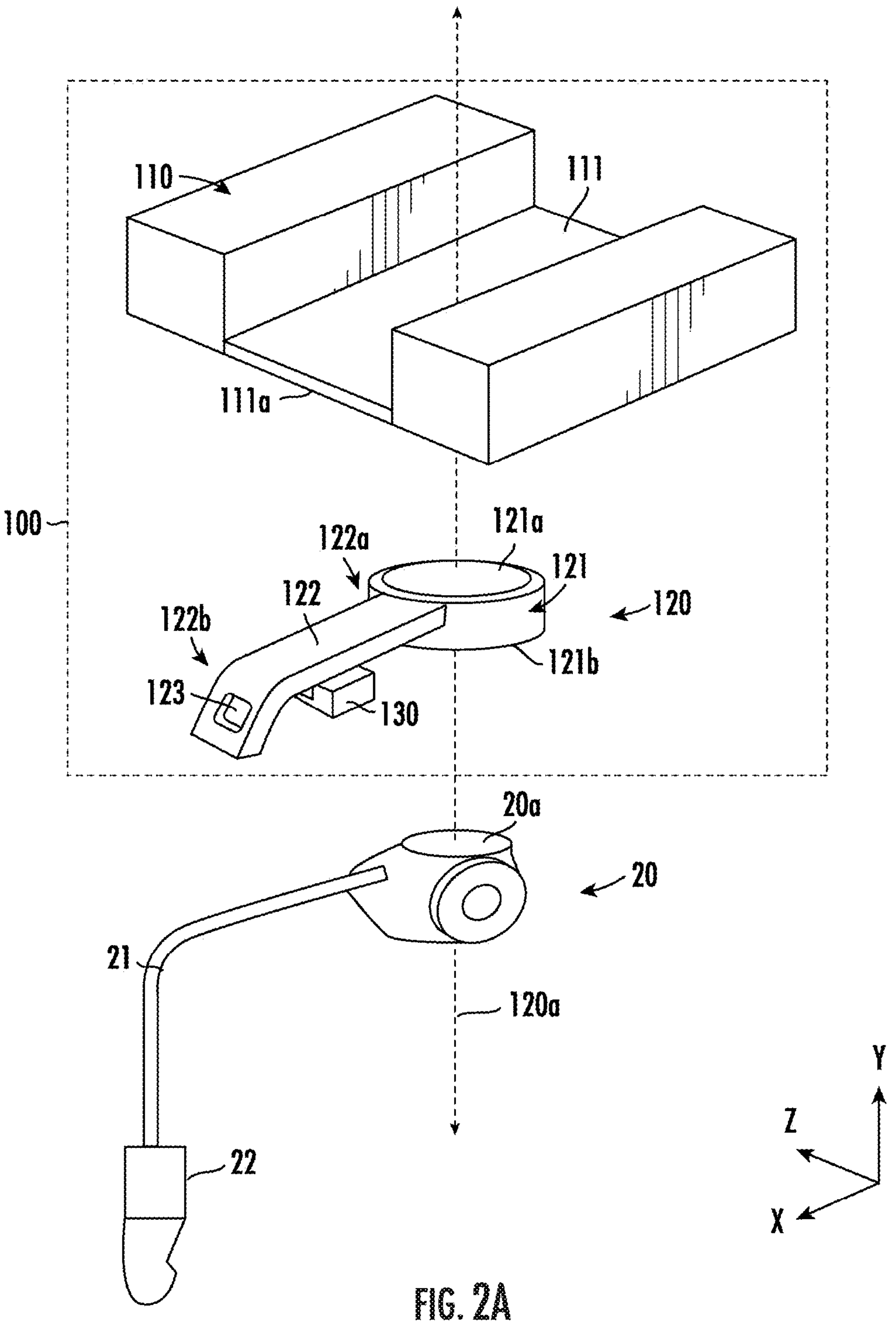
FIGS. 2A and 2B illustrate various views of an exemplary mounting device associated with fall protection equipment according to an example embodiment described herein.
Figure 2B:
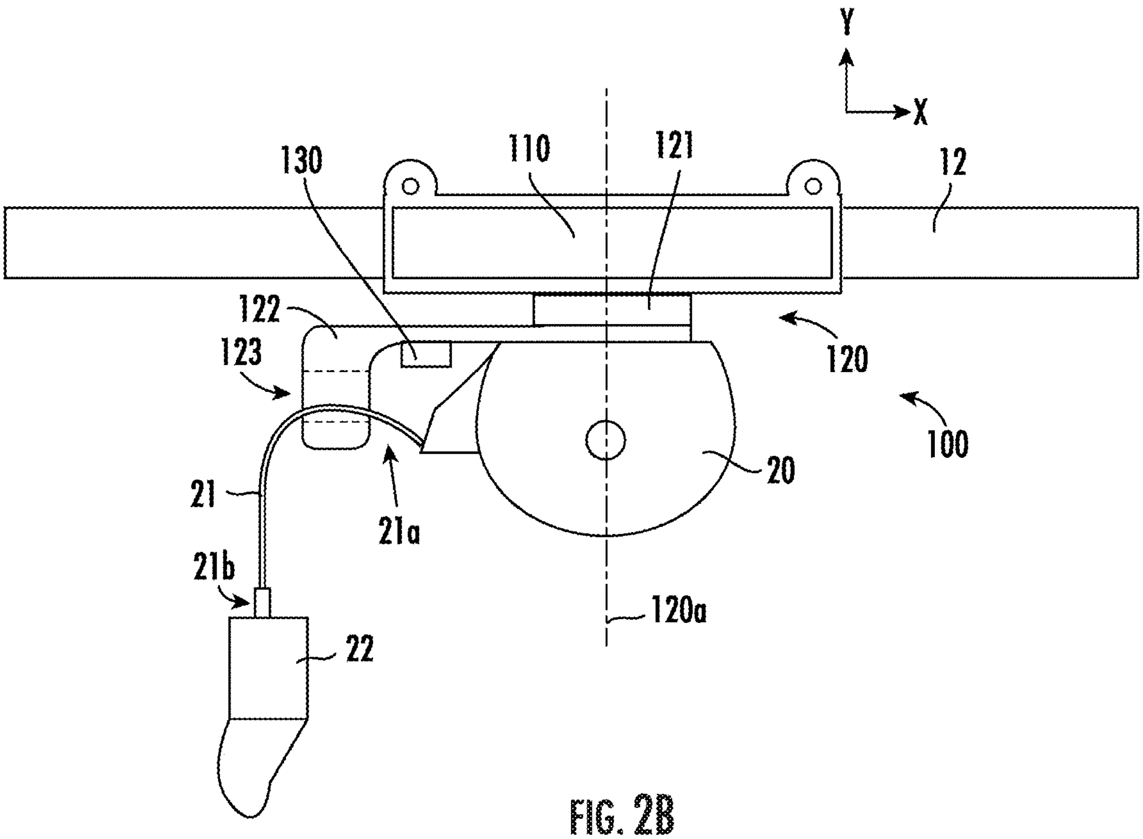

FIGS. 2A and 2B illustrate various views of an exemplary mounting device for a personal fall limiter according to various embodiments described herein. In particular, FIG. 2A and FIG. 2B illustrate an exploded view and a side-cross-sectional view, respectively, of an exemplary mounting device 100 configured for engagement with a fall protection device 20 according to an exemplary embodiment described herein. As illustrated, in various embodiments, an exemplary mounting device 100 may comprise a mounting bracket 110 at which the mounting device 100 may be attached to a materials handling vehicle, and a rotary arm 120 rotatably connected to the mounting bracket 110 and configured for engagement with a fall protection device 20 and rotation relative to the mounting bracket 110 (e.g., about an axis of rotation 120*a*) to facilitate an expanded range of motion within the workspace for an operator operatively connected to the fall protection device (e.g., via a webbing engaged with the rotary arm 120).

In various embodiments, a mounting bracket 110 of the exemplary mounting device 100 may be configured for attachment to an upper frame element (e.g., a ceiling) of a materials handling vehicle to secure the mounting device 100 relative to the materials handling vehicle in a position at least substantially above a workspace defined by the materials handling vehicle. In various embodiments, the mounting bracket 110 may comprise an arm interface portion 111 to which the rotary arm 120 may be rotatably connected, as described herein, and one or more fastening means configured to engage at least an upper frame element of the materials handling vehicle to fixedly secure the arm interface portion 111 to the upper frame element. In various embodiments, the one or more fastening means of the mounting bracket 110 may embody any applicable fastening means configured to facilitate a coupling of the mounting bracket 110 (e.g., the arm interface portion 111) in a fixed position above the workspace defined by the materials handling vehicle.

In various embodiments, the rotary arm 120 of an exemplary mounting device 100 may be rotatably connected to the mounting bracket 110 (e.g., at a bottom surface 111*a* of an arm interface portion 111) such that the rotary arm 120 defines a position below the mounting bracket 110 (e.g., relative to a vertical direction defined by a ground surface upon which an exemplary materials handling vehicle to which the mounting device is coupled is positioned). In various embodiments, an attachment end (e.g., an arm base 121) of the rotary arm 120 is secured relative to the mounting bracket 110 at via a fastening means that allows for the rotary arm 120 to rotate relative to the mounting bracket 110 about an axis of rotation 120*a* defined at the attachment end of the rotary arm 120. For example, in various embodiments, the attachment end of the rotary arm 120 may be defined by an arm base 121 that defines a central axis extending therethrough and is connected to the mounting bracket 110 via a rotatable joint, fastener, bearing assembly, and/or any other rotatable attachment means that enables the arm base 121 to be rotated relative to the mounting bracket 110 about the central axis thereof. In various embodiments, as illustrated, the arm base 121 may be configured for attachment relative to the arm interface portion 111 of the mounting bracket 110 such that the central axis of the arm base 121 extends through the both the arm base and the mounting bracket 110 (e.g., in a direction perpendicular to the portion of the bottom surface 111*a* of the arm interface portion 111 to which that arm base 121 is operatively connected. In such an exemplary embodiment, the axis of rotation of the rotary arm 120 may be defined by central axis of the arm base 121. As an illustrative example, in various embodiments, the mounting device 100 may be configured such that, upon the mounting bracket 110 being secured relative to an upper frame element of a materials handling vehicle, the axis of rotation 120*a* defined by the mounting device 100 may embody an at least substantially vertical axis, such as, for example, an axis in the y-direction as defined in the exemplary orientation illustrated in FIGS. 2A and 2B. For example, in various embodiments, an exemplary mounting device 100 may be configured such that the rotary arm 120 is configured for rotation about an axis of rotation 120*a* defined in a perpendicular direction relative to the arm interface portion 111 (e.g., a bottom surface 111*a* thereof) of the mounting bracket 110. In such an exemplary configuration, the rotary arm 120 may be configured to rotate throughout a range of rotational motion that is defined within a rotational plane that is at least substantially parallel to the bottom surface 111*a* of the mounting bracket 110 (e.g., in a z-x plane as defined in the exemplary orientation illustrated in FIG. 2A).

In various embodiments, the arm base 121 of an exemplary rotary arm 120 may define an upper arm base portion 121*a* configured to facilitate the attachment of the arm base 121 (e.g., the rotary arm 120) relative to the arm interface portion 111 (e.g., the bottom surface 111*a*) of the mounting bracket 110. Further, in various embodiments, the arm base 121 of the exemplary rotary arm 120 may define a lower arm base portion 121*b* configured for receiving a fall protection device 20 to secure the fall protection device 20 relative to the rotary arm 120 and facilitate the coupling of the fall protection device 20 to the mounting device 100. For example, at least a portion of an exemplary fall protection device 20, such as, for example, a body portion 20*a* of the fall protection device 20, may be attached to the lower arm base portion 121*b* via a fastening means configured for coupling the body 20*a* of the fall protection device 20 to the arm base 121, such as, for example a hook assembly, a latch element, a snap feature, one or more guide track features, and/or any other applicable fastening means configured to facilitate the rigid attachment of the body 20*a* of the fall protection device 20 to the arm base 121 of the rotary arm 120. For example, in various embodiments, as described herein, the fall protection device 20 may be secured to the arm base 121 of the rotary arm 120 such that the fall protection device 20 rotates with the arm base 121 through a range of rotational motion defined relative to the axis of rotation 120*a*. As such, the alignment of a webbing outlet defined by the body 20*a* of the fall protection device 20 relative to an extension arm 122 of the rotary arm 120, as described herein, may be maintained throughout a full 360-degree rotation of the rotary arm 120 about the axis of rotation 120*a*.

Further, as illustrated, the rotary arm 120 of an exemplary mounting device 100 may comprise an extension arm 122 comprising a rigid linear element (e.g., a rod and/or the like) that is rigidly secured relative to the arm base 121 such that extension arm 122 rotates about the central axis of the arm base 121 (e.g., about the axis of rotation 120*a*) with the arm base 121. As illustrated in FIG. 2A, the extension arm 122 may have an arm length defined between a proximal arm end 122*a* defined at the arm base 121 and an opposing distal arm end 122*b*. In various embodiments, the extension arm 122 may extend from a portion of the arm base 121 in a radially outward direction relative to central axis of the arm base 121 such that the distal arm end 122*b* of the extension arm 122 defines a radially extended position separated from the arm base 121 (e.g., the central axis thereof) by an extension distance (e.g., as measured in a radially outward direction relative to the axis of rotation 120*a*) that is defined at least in part by the arm length of the extension arm 122. For example, the rotary arm 120 may be configured such that a rotation of the rotary arm 120 throughout the range of rotational motion thereof (e.g., about the axis of rotation 120*a*) may include the distal arm end 122*b* being rotated within a rotational plane that is at least substantially perpendicular to the axis of rotation 120*a* defined by the rotary arm 120 (e.g., in a z-x plane as defined in the exemplary orientation illustrated in FIG. 2A). As a non-limiting illustrative example, the rotary arm 120 of the exemplary mounting device 100 may be configured such that the rotational plane within which the distal arm end 122*b* moves as the rotary arm 120 is rotated throughout the range of rotational motion (about the axis of rotation 120*a*) may embody an at least substantially horizontal plane (e.g., relative to a horizontal direction defined by a ground surface upon which an exemplary materials handling vehicle to which the mounting device is coupled is positioned).

In various embodiments, the extension arm 122 of the rotary arm 120 may define a webbing retention feature 123 configured for receiving a portion of a webbing 21 of a fall protection element 20 defined between the body 20*a* and an attachment element 22 to define an intermediate webbing anchor position that is moveable with the rotation of the rotary arm 120 to facilitate an expanded range of motion within a workspace for an operator that is operatively attached to the fall protection device 20 (e.g., via the webbing 21). In various embodiments, as illustrated, the webbing retention feature 123 may be defined along the extension arm 122 in a position at least substantially proximate the distal arm end 122. The webbing retention feature 123 may be configured to facilitate the arrangement of at least a portion of the webbing 21 (e.g., an intermediate webbing portion thereof) relative to the distal arm end 122*b* of the extension arm 122 by enabling the webbing 21 to be threaded through the webbing retention feature 123 such that the webbing 21 remains in contact with the extension arm 122 throughout the rotation of the rotary arm 120 through the range of rotational motion, as described herein.

For example, in various embodiments, an exemplary mounting device 100, as illustrated in FIGS. 2A and 2B, may be configured to receive the webbing 21 within the webbing retention feature 123 by the webbing 21 being provided from the body 20*a* of the fall protection device 20 mounted to the arm base 121 through the webbing retention feature 123 in an outward direction (e.g., away from the central axis of the arm base 121). The extension arm 122 may be configured such that, upon the webbing 21 being provided through the webbing retention feature 123, the webbing 21 may physically contact (e.g., wrap around) at least a portion of the extension arm 122 defined at the distal arm end 122*b* such that the remaining portion of the webbing 21 defined between the webbing retention feature 123 and the attachment element 22 is suspended from the distal arm end 122*b* in an at least partially downward vertical direction (e.g., in the negative y-direction according to the exemplary orientations illustrated in FIGS. 2A and 2B). As shown, the webbing retention feature 123 is configured to receive the webbing 21 therethrough such that, rather than the webbing 21 extending directly from the body 20*a* of the fall protection device 20 to the attachment element 22, the webbing 21 is guided through the webbing retention feature 123 as it extends along a webbing length thereof from body 20*a* to the attachment element 22. In various embodiments, the mounting device 100 may be engaged with the fall protection device 20 such that a first length portion 21*a* of the webbing 21 extends from the body 20*a* in a radially outward direction (e.g., relative to the axis of rotation 120*a*) to the webbing retention feature 123, and a second length portion 21*b* of the webbing 21 extends from the webbing retention feature 123 in a second direction defined in an at least partially vertical direction to the attachment element 22 that may be operatively secured relative to an operator positioned within a workspace defined below the mounting device 100. For example, the second length portion 21*b* of the webbing 21 provided between the distal arm end 122*b* (e.g., the webbing retention feature 123) and an operator attachment (e.g., a wearable harness) may define a subrange of operator motion that is defined by an area within the workspace throughout which an operator may move relative to the distal arm end 122*b* without causing the rotary arm 120 to be rotated (e.g., as a result of drag and/or tension forces caused by a an operator movement pulling on the webbing 21).

In various embodiments wherein the attachment element 22 of the fall protection device 20 is connected to an operator attachment, an exemplary mounting device 100 may be configured such that one or more forces generated by a movement of the operator within the workspace (e.g., an operator movement imparting pulling force on the operator attachment) may be transmitted from the operator attachment to the rotary arm 120 via the webbing 21 (e.g., the second length portion 21*b*). For example, the one or more forces may act on the rotary arm 120 at the webbing retention feature 123 defined by the extension arm 122 (e.g., an extended webbing engagement point) such that a non-linear torque and a moment are imparted on the extension arm 122, causing the rotary arm 120 to rotate in a corresponding rotational direction about the axis of rotation 120*a*. As described herein, the arrangement of the webbing within the webbing retention feature 123 and the physical engagement of the webbing 21 with the extension arm 122 may enable at least a portion of the one or more forces present within the webbing 21 (e.g., from the operator attachment) as a result of a movement of the operator throughout the workspace to be at least partially mitigated by the mounting device 100 prior to being transmitted to fall protection device 20. In various embodiments, the mounting device 100 being configured to receive an intermediate length portion of the webbing 21 of the fall protection device 20 at a webbing retention feature 123 defined by a rotary arm 120 that is rotatable about an axis of rotation 120*a* enables an operator that operatively connected to the fall protection device 20 to experience an at least substantially reduced (e.g., minimized) drag force from the fall protection device 20 as the operator moves throughout the workspace.

The portion of the extension arm 122 at which the webbing 21 physically contacts the extension arm 122 (e.g., within the webbing retention feature 123 and/or upon the webbing being provided therethrough) may define an extended webbing engagement point from which the webbing 21 may extend from the rotary arm 120 to the attachment element 22. The extension arm 122 may be configured such that the extended webbing engagement point defined at the distal arm end 122*b* (at least substantially adjacent the webbing retention feature 123) is spatially separated from the arm base 121 and the body 20*a* of the fall protection device 20 secured thereto by a radial distance measured relative to the axis of rotation 120*a*. For example, the extended webbing engagement point may correspond at least in part to the radially extended position of the distal arm end 122*b* of the rotary arm 120 relative to the axis of rotation 120*a*. In such an exemplary configuration, as the extension arm 122 is rotated throughout a range of rotational motion, the extended webbing engagement point is similarly rotated about the axis of rotation 120*a* such that a subrange of operator motion defined relative to the extended webbing engagement point (e.g., at the webbing retention feature 123 of the rotary arm 120) is relocated (e.g., shifted) from a first area within the workspace to a second area within the workspace. An exemplary mounting device 100 may be configured to enable the rotary arm 120 to be rotated 360 degrees about the axis of rotation 120*a* defined by the central axis of the arm base 121 in both clockwise and counterclockwise rotational directions, depending on the movement(s) of an operator through the workspace defined by the materials handling vehicle. For example, as the rotary arm 120 is rotated through a full 360-degree range of rotational motion, the collective area covered by the shifting subranges of operator motion defined relative to the rotating extended webbing engagement point including both the first and second areas described above—may define an expanded overall range of motion within the workspace.

The rotary arm 120 of the mounting device 100 being rotatably connected to the mounting bracket 110 and defining a 360-degree range of rotational motion reduces the amount of drag force that is realized by the webbing 21 as an operator operatively connected to an attachment element 22 of the fall protection device 20 moves throughout the workspace below the mounting device 100. Further, the mounting device 100 being configured to reduce the drag forces associated with operator movement about the workspace enables a fall protection device 20 secured thereto to be connected to the operator (e.g., via an attachment element 22) with a minimal amount of slack (e.g., excess material length) present in the webbing 21 during operation. For example, traditional means of providing an excess length of webbing 21 between the body 20*a* and the attachment element 22 to reduce the drag force realized by the fall protection device 20 during operator movement are overcome by the exemplary mounting device 100 described herein, enabling a minimization of the length of the webbing 21 that corresponds to a safer operating condition for the operator.

In various embodiments, an exemplary mounting device 100 may further comprise a first sensing device configured to detect a position and/or movement of at least a portion of a webbing 21 provided within the webbing retention feature 123 relative to the 123. For example, in various embodiments, the first sensing device may comprise an imaging device 130 configured to capture imaging data comprising at least one image that shows at least a portion of the webbing 21 of a fall protection device 20 that is provided within, at, and/or at least substantially adjacent to the webbing retention feature 123 defined by the rotary arm 120 of the mounting device 100. In various embodiments, the imaging device 130 may at least substantially continuously, serially, and/or periodically capture image data including a plurality of images and/or the like that may be at least substantially continuously processed (e.g., by the controller 140) and/or analyzed such that the exemplary mounting device 100 is configured to at least substantially continuously monitor the position and/or movement(s) of the webbing 21 within the webbing retention feature 123 (e.g., relative to the imaging device 130) that may be utilized to determine an connection condition of the fall protection device 20 relative to an operator attachment at a plurality of instances in series. As described herein, the imaging device 130 may embody an optical sensor secured to the extension arm 122 and having a line of sight defined directly between the imaging device 130 and the webbing retention feature 123.

Figure 3:
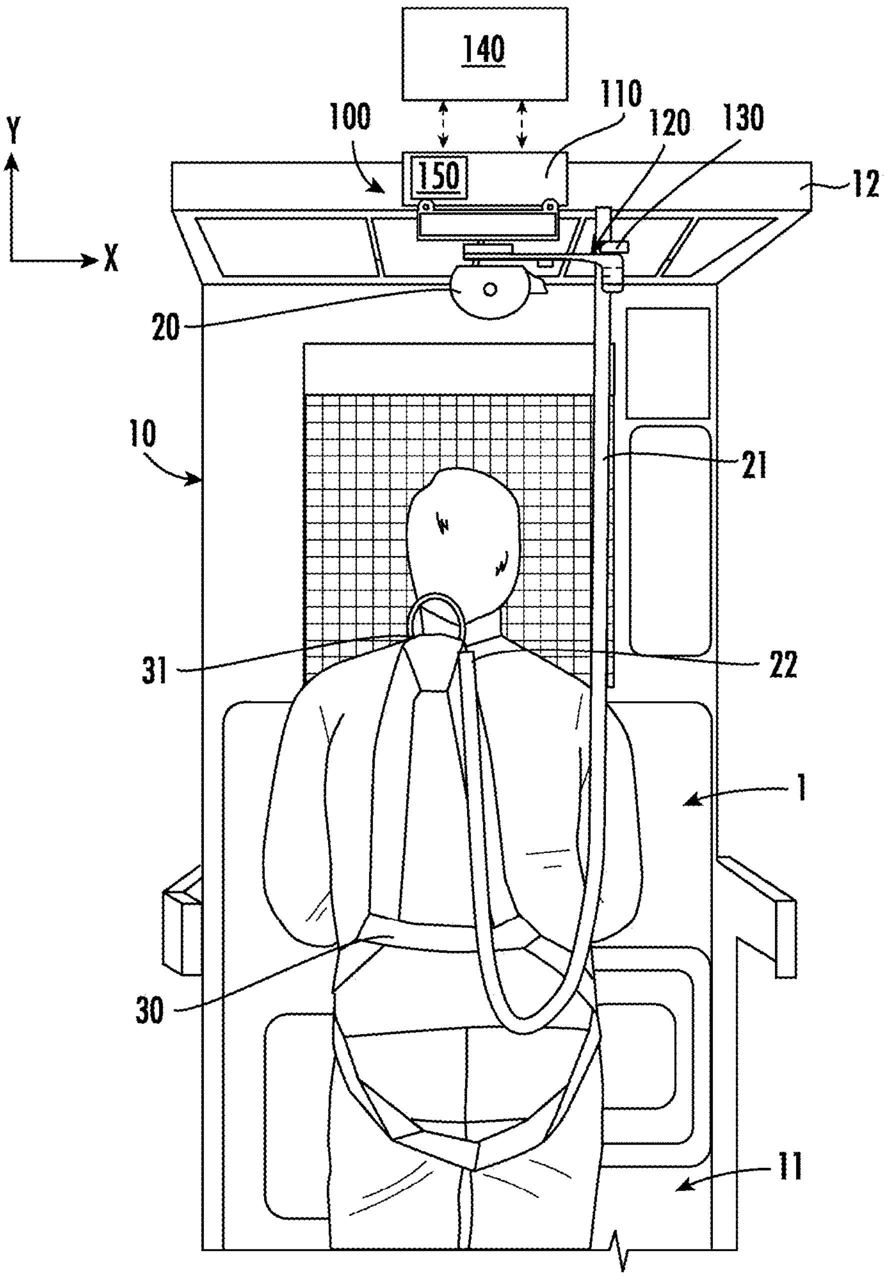
FIG. 3 illustrates a rear view of a materials handling vehicle and an exemplary mounting device associated with fall protection equipment according to an example embodiment described herein.

In various embodiments, the imaging device 130 may be fixedly secured relative to the rotary arm 120 of the mounting device 100. For example, FIG. 3 illustrates an exemplary mounting device 100 comprising an imaging device 130 that is secured to the rotary arm 120 at a position along the extension arm 122 that is configured for movement with the extension arm 122 (e.g., the distal arm end 122*b*) such that the imaging device 130 does not move relative to the webbing retention feature 123. For example, in various embodiments, the imaging device 130 may be secured to the rotary arm 120 in a position relative to the extension arm 122 such that the imaging device 130 has a direct line of sight to the webbing retention feature 123 defined by the extension arm 122, such as, for example, at a position within the webbing retention feature 123, at the distal arm end 122*b* of the extension arm 122, and/or otherwise at least substantially proximate webbing retention feature 123.

In various embodiments, the imaging device 130 may comprise an imaging component, such as, for example, a camera having a resolution of at least 720p and being configured to capture imaging data comprising videos, images, and/or the like, an optical lens configured to define a field of view of the imaging device 130, an imaging device processing unit, various internal circuitries configured to the facilitate power management and connectivity and/or networked communication of the imaging device 130. In various embodiments, the imaging device 130 may have a designated field of view for capturing, permanently and/or temporarily, one or more images of at least a portion of the webbing 21 of a fall protection device 20 that is provided within the webbing retention feature 123 of the mounting device 100. For example, in various embodiments, the imaging device 130 may be positioned relative to the webbing retention feature 123 of the rotary arm 120 such that at least a portion of a width of the webbing 21 provided within the webbing retention element 123 is disposed within the field of view of the imaging device 130. As a non-limiting example, in various embodiments, the imaging device 130 may be positioned relative to the webbing retention element 123 such that the optical lens of the imaging device 130 is separated from the portion of a width of the webbing 21 provided within the webbing retention element 123 by a distance of at least approximately between 10.0 mm and 25.0 mm. As a further example, in various embodiments, based at least in part on the positioning of the imaging device 130 (e.g., relative to the webbing retention feature 123), the optical lens of the imaging device may be configured such that the field of view of the imaging device 130 may be at least approximately between 1 degree and 180 degrees (e.g., between 15 degrees and 45 degrees. In various embodiments, the imaging device processing unit of the imaging device 130 may comprise one or more hardware components and/or circuitries that are distinct from the controller 140 of the mounting device 100. Alternatively, or additionally, in various embodiments, one or more hardware components, circuitries, and/or functionalities of the imaging device processing unit of the imaging device 130 may be defined by the controller 140, as described herein, such that the imaging device processing unit of the imaging device 130 may be defined as part of the controller 140.

In various embodiments, the imaging device 130 may be configured to capture imaging data of the webbing 21 provided within the webbing retention feature 123 to facilitate a detection of a movement, such as, for example, a micro-movement, of the webbing 21 relative to the extension arm 122 (e.g., within the webbing retention feature 123). As a non-limiting example provided for illustrative purposes, in various embodiments, the imaging device 130 of an exemplary mounting device 100 may be positioned within the webbing retention feature 123 and may comprise a sensing means configured to capture imaging data to execute a motion-sensing operation that is at least substantially similar to the motion-sensing operation executed by a computer mouse to detect a movement thereof relative to an underlying surface. That is, in various embodiments, the imaging device 130 may be positioned within the webbing retention feature 123 and configured to capture imaging data to detect and/or characterize a relative movement, and/or lack thereof, of the portion of the webbing 21 disposed within the webbing retention feature 123 with respect to one or more adjacent surfaces of the extension arm 122 that define the webbing retention feature 123. The imaging data captured by the imaging device 130 may be utilized by the mounting device 100 to detect one or both of a movement condition defined by a detected movement (e.g., a micro-movement) of the webbing 21 portion within the webbing retention feature 123 relative to the imaging device 130 and/or an adjacent surface of the extension arm 122, and a stationary condition defined by the webbing 21 portion within the webbing retention feature 123 exhibiting at least substantially negligible movement relative to the imaging device 130 and/or the adjacent surface of the extension arm 122. As described herein, the detection of a movement condition and/or a stationary condition by the imaging device 130, as defined by the webbing 21 within the webbing retention feature 123, may define an input variable that may be utilized by the mounting device 100 in combination with one or more other input variables defined by mounting device sensor data, such as, for example, device movement data captured by a second sensing device that detects and/or characterizes any movement of the mounting bracket 110 and/or the rotary arm 120, to determine whether the attachment element 22 of the fall protection device 20 is attached to the operator attachment 31.

Further, in various embodiments, an exemplary mounting device 100 may further comprise a second sensing device configured to detect a movement of the mounting device 100 secured relative to the materials handling vehicle (e.g., a linear movement of the mounting bracket 110, a rotational movement of the rotary arm 120, and/or the like). In various embodiments, as further illustrated in FIG. 3, the second sensing device may comprise a motion-sensing device 150 configured to capture sensor data that correspond to one or more movements, or lack thereof of, of the mounting device 100 in any and/or all of six directions (e.g., defining six degrees of freedom). For example, the motion-sensing device 150 may comprise a motion-sensing device configured to execute a six-degrees-of-freedom ("6DOF") motion-sensing operation in order to detect and/or characterize any movement of the mounting bracket 100. In various embodiments, the motion-sensing device 150 may comprise a gyroscope and an accelerometer that are each configured to detect movement of the mounting bracket 100 in a respective direction based on one or more inertial measurements captured as device movement data by the motion-sensing device 150. The motion-sensing device 150 may at least substantially continuously, serially, and/or periodically capture device movement data that may be at least substantially continuously processed (e.g., by the controller 140) and/or analyzed such that the exemplary mounting device 100 is configured to at least substantially continuously monitor the movements of the mounting device 100 at a plurality of instances in series.

As illustrated in the exemplary mounting device 100 shown in FIG. 3, in various embodiments, the motion-sensing device 150 may be fixedly secured relative to the mounting bracket 110 of the mounting device 100. As illustrated, the motion-sensing device 150 may be secured to the mounting bracket 110 such that a movement of the materials handling vehicle 10 in one or more directions during an operation thereof may correspond to a similar movement of the mounting bracket 110 rigidly secured thereto (e.g., at the upper frame element 12), and thus, may define a movement of the motion-sensing device 150 secured to the mounting bracket 110 that may be detected and/or characterized by the motion-sensing device 150. Further, the motion-sensing device 150 may be secured to the mounting bracket 110 at a position that enables the motion-sensing device 150 to detect a movement (e.g., a rotation) of the rotary arm 120 relative to the mounting bracket 110.

In various embodiments, the detection of a movement of the mounting bracket 100 by the motion-sensing device 150 may define an input variable that may be utilized by the mounting device 100 in combination with a second input variable defined the movement condition and/or a stationary condition defined by the webbing 21 within the webbing retention feature 123, as captured by the imaging device 130, to determine whether the attachment element 22 of the fall protection device 20 is attached to the operator attachment 31. For example, the motion-sensing device 150 may be configured to capture device movement data associated with the mounting device 100 (e.g., the mounting bracket 110 and/or the rotary arm 120) that corresponds to one or more movements of the materials handling vehicle 10 and/or the operator 1 positioned within the workspace 11. Accordingly, the device movement data captured by the motion-sensing device 150 may be utilized by the mounting device 100 to determine whether the webbing 21 within the webbing retention feature 123 should define movement condition and/or the stationary condition at a particular instance based at least in part on whether a movement of the mounting bracket 100 was detected by the motion-sensing device 150 at that particular instance. As described herein, the mounting device 100 may be configured to determine that the attachment element 22 of the fall protection device 20 defines a disconnected condition relative to the operator attachment 31 based on a detection that the webbing 21 within the webbing retention feature 123 defines a stationary condition (e.g., as captured by the imaging device 130) during a detected movement of the mounting device 100 (e.g., as captured by the motion-sensing device 150).

As described herein, in various embodiments, the mounting device 100 may comprise a first sensing device and a second sensing device configured to at least substantially continuously, serially, and/or periodically capture data (e.g., imaging data, device movement data, and/or the like) that may be at least substantially continuously processed (e.g., by the controller 140) to at least substantially continuously monitor and/or determine a plurality of data outputs, such as, for example, a movement condition and/or a stationary condition defined by the webbing 21 within the webbing retention feature 123 and a detected movement condition defined by the mounting device 100 (e.g., a linear movement of the mounting bracket 110 and/or a rotation of the rotary arm 120), which may utilized to collectively determine and/or define an installation condition of the fall protection device 20 relative to an operator attachment at a particular instance (e.g., instantaneously) and/or at a plurality of sequential instances (e.g., serially).

Further, in various embodiments, the rotary arm 120 (e.g., the arm base 121) may define a hollow interior through which one or more wires (e.g., power circuitry) may be provided in order to enable the electronic communication of the first sensing means 130 with one or more other electronic components of the mounting device 100 and/or the materials handling vehicle, such as, for example, a controller of the mounting device, the power circuitry of the materials handling vehicle, and/or the like. As described herein, the one or more wires may extend through the arm base 121 of the rotary arm 120 and be directed along the arm length of the extension arm 122 to facilitate an electronic connection with the first sensing means 130 (e.g., at the webbing retention feature 123). In various embodiments, the fastening means used for securing the rotary arm 120 relative to the mounting bracket 110 and defining the rotatable configuration of the rotary arm 120 may include various fastening elements such as bearings, discs, rings, and/or the like that enable the arm base 121 of the rotary arm 120 to be rotated through a full 360-degree range of rotational motion without causing the one or more wires disposed therethrough to be twisted and/or otherwise undesirably rearranged. For example, the rotary arm 120 may utilize one or more slip rings configured to allow various power and/or control circuitries provided within the arm base 121 to remain untwisted and/or avoid further undesirable twisting as the arm base 121 of the rotary arm 120 is rotated through a 360-degree range of rotation, as described herein.

Figure 4:
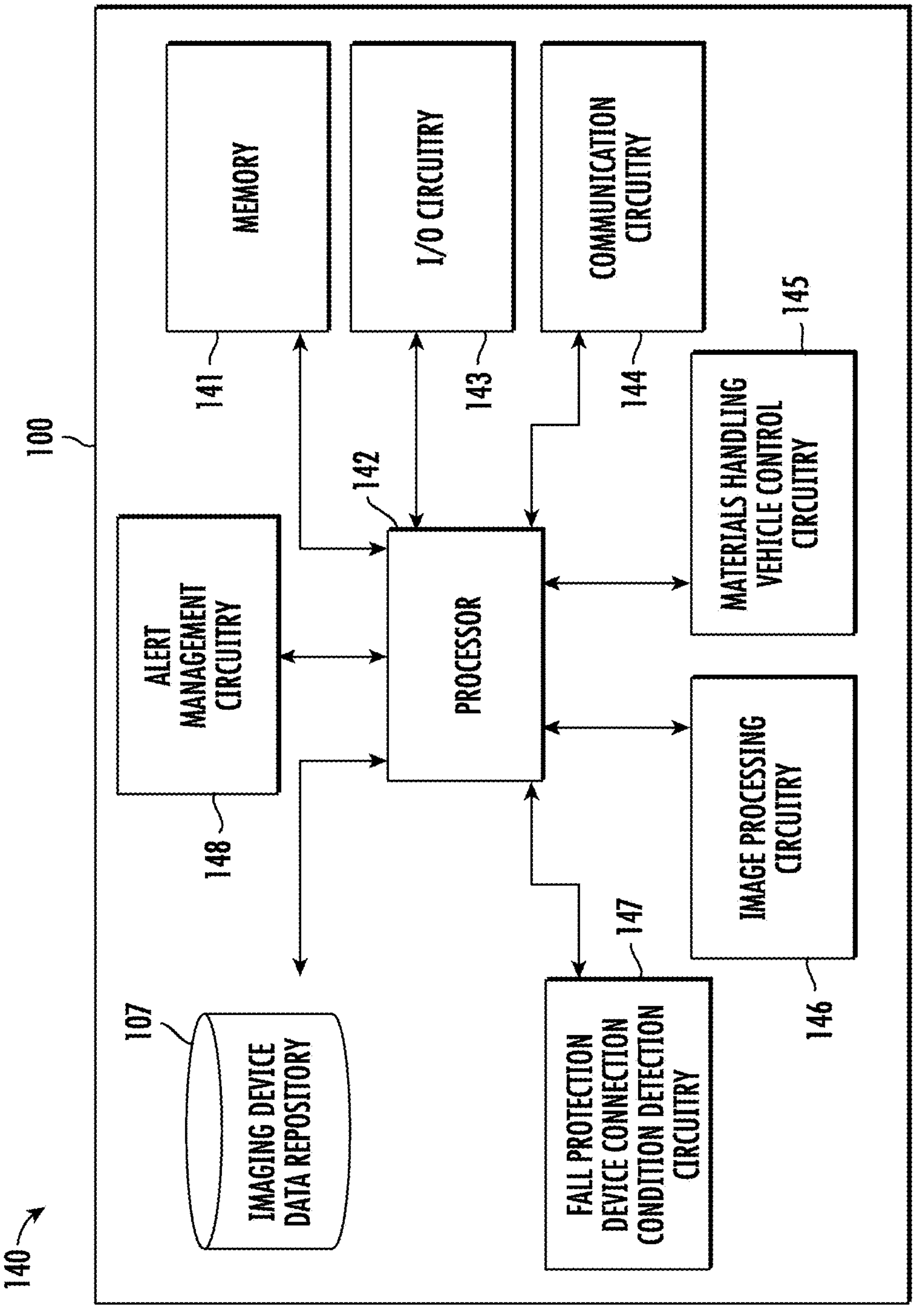
FIG. 4 illustrates a schematic view of an exemplary apparatus in accordance with various embodiments.

As illustrated in FIG. 4, an exemplary mounting device 100 may comprise a controller 140 comprising a memory 141, a processor 142, input/output circuitry 143, communication circuitry 144, an imaging device data repository 107, materials handling vehicle control circuitry 145, image processing circuitry 146, fall protection device connection condition detection circuitry 147, and alert management circuitry 148. The controller 140 may be configured to execute the operations described herein. Although the components are described with respect to functional limitations, it should be understood that the particular implementations necessarily include the use of particular hardware. It should also be understood that certain of the components described herein may include similar or common hardware. For example, two sets of circuitry may both leverage use of the same processor, network interface, storage medium, or the like to perform their associated functions, such that duplicate hardware is not required for each set of circuitry.

The term "circuitry" should be understood broadly to include hardware and, in some embodiments, software for configuring the hardware. For example, in some embodiments, "circuitry" may include processing circuitry, storage media, network interfaces, input/output devices, and the like. In some embodiments, other elements of the controller 140 may provide or supplement the functionality of particular circuitry. For example, the processor 142 may provide processing functionality, the memory 141 may provide storage functionality, the communication circuitry 144 may provide network interface functionality, and the like.

In some embodiments, the processor 142 (and/or co-processor or any other processing circuitry assisting or otherwise associated with the processor) may be in communication with the memory 141 via a bus for passing information among components of the device. The memory 141 may be non-transitory and may include, for example, one or more volatile and/or non-volatile memories. For example, the memory 141 may be an electronic storage device (e.g., a computer readable storage medium). In various embodiments, the memory 141 may be configured to store information, data, content, applications, instructions, or the like, for enabling the device to carry out various functions in accordance with example embodiments of the present disclosure. It will be understood that the memory 141 may be configured to store partially or wholly any electronic information, data, data structures, embodiments, examples, figures, processes, operations, techniques, algorithms, instructions, systems, apparatuses, methods, look-up tables, or computer program products described herein, or any combination thereof. As a non-limiting example, the memory 141 may be configured to store data captured by a first sensing device of the mounting device 100 (e.g., imaging data captured by an imaging device), corresponding data generated by the controller 140 of the mounting device 100, timestamp data, location data, historical data and/or the like, associated with a workspace (e.g., a materials handling vehicle).

The processor 142 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 142 may be configured to execute instructions stored in the memory 141 or otherwise accessible to the processor. Alternatively, or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present disclosure while configured accordingly. Alternatively, as another example, when the processor is embodied as an executor of software instructions, the instructions may specifically configure the processor to perform the algorithms and/or operations described herein when the instructions are executed.

In some embodiments, the controller 140 may include input-output circuitry 143 that may, in turn, be in communication with the processor 142 to provide output to a user and, in some embodiments, to receive input such as a command provided by the user. The input-output circuitry 143 may comprise a user interface, such as a graphical user interface (GUI), and may include a display that may include a web user interface, a GUI application, a mobile application, a client device, or any other suitable hardware or software. In some embodiments, the input-output circuitry 143 may also include a display device, a display screen, user input elements, such as a touch screen, touch areas, soft keys, a keyboard, a mouse, a microphone, a speaker (e.g., a buzzer), a light emitting device (e.g., a red light emitting diode (LED), a green LED, a blue LED, a white LED, an infrared (IR) LED, or a combination thereof), or other input-output mechanisms. The processor 142, input-output circuitry 143 (which may utilize the processing circuitry), or both may be configured to control one or more functions of one or more user interface elements through computer-executable program code instructions (e.g., software, firmware) stored in a non-transitory computer-readable storage medium (e.g., memory 141). Input-output circuitry 143 is optional and, in some embodiments, the controller 140 may not include input-output circuitry. For example, in various embodiments, the controller 140 may generate one or more alert signals (e.g., data) to be transmitted to one or more other devices with which one or more authorized users (a manager, safety coordinator, and/or the like) directly interact and cause the one or more alert signals to be transmitted at the one or more other devices.

The communication circuitry 144 may be a device or circuitry embodied in either hardware or a combination of hardware and software that is configured to receive and/or transmit data from/to a network and/or any other device, circuitry, or module in communication with the controller 140. For example, the communication circuitry 144 may be configured to communicate with one or more computing devices via wired (e.g., USB) or wireless (e.g., Bluetooth, Wi-Fi, cellular, and/or the like) communication protocols. For example, in various embodiments, the communication circuitry 144 may be configured to facilitate data communication between an exemplary mounting device 100 and one or more external computing devices via wired (e.g., USB, ethernet, and/or the like) and/or wireless (e.g., Bluetooth, Wi-Fi, cellular, and/or the like) communication protocols.

In various embodiments, the processor 142 may be configured to communicate with the materials handling vehicle control circuitry 145. The materials handling vehicle control circuitry 145 may be a device or circuitry embodied in either hardware or a combination of hardware and software that is configured to facilitate an operation of a materials handling vehicle 10 by generating a control signal configured to operate one or both of a drive assembly and a lift assembly of the materials handling vehicle 10 in response to an interaction of an operator 1 with one or more vehicle operation controls (e.g., user controls) of the materials handling vehicle 10 from an operating position within a workspace 11. In various embodiments, the materials handling vehicle control circuitry 145 may be configured to receive a first control signal based on operator interaction with the vehicle operation controls of the materials handling vehicle 10), and, in response, transmit a corresponding signal to one or more circuitries of the controller 140, such as, for example, the fall protection device connection condition detection circuitry 147, in order to facilitate detection of a connection condition (e.g., a connected configuration) based at least in part on the materials handling vehicle 10 being operated by the operator at an instance when the controller 140 determines (e.g., based on imaging data from a first sending device) that the webbing of a fall protection device at a webbing retention feature defines a movement condition. As a non-limiting example provided for illustrative purposes, in an exemplary circumstance wherein the materials handling vehicle control circuitry 145 receives a first control signal embodying a user operation of the drive assembly and/or the lift assembly of the materials handling vehicle 10, the materials handling vehicle control circuitry 145 may be configured to transmit a corresponding signal to the fall protection device connection condition detection circuitry 147 so as to enable a detection of a connection condition defined by the fall protection device 20 relative to an operator attachment, based at least in part on a movement condition and/or a stationary condition defined by the webbing of the fall protection device at a webbing retention feature of a mounting device 100, as determined by imaging data captured by a first sensing device 130 (e.g., an imaging device).

For example, in an exemplary embodiment wherein the materials handling vehicle control circuitry 145 receives a first control signal embodying a user operation of the drive assembly and/or the lift assembly of the materials handling vehicle 10, and the fall protection device connection condition detection circuitry 147 detects a movement condition defined by the webbing of the fall protection device at the webbing retention feature of the mounting device 100, the mounting device 100 may be configured to determine that the attachment element of the fall protection device defines a connected configuration relative to the operator attachment. In such an exemplary configuration, the controller 140 (e.g., the fall protection device connection condition detection circuitry 147) may detect a connection condition associated with the fall protection device based at least in part on the connected configuration detected by the controller 140. Further, in an exemplary embodiment wherein the materials handling vehicle control circuitry 145 receives a first control signal embodying a user operation of the drive assembly and/or the lift assembly of the materials handling vehicle 10, and the fall protection device connection condition detection circuitry 147 detects a stationary condition defined by the webbing of the fall protection device at the webbing retention feature of the mounting device 100, the mounting device 100 may be configured to determine that the attachment element of the fall protection device defines a disconnected configuration relative to the operator attachment. In such an exemplary configuration, the controller 140 (e.g., the fall protection device connection condition detection circuitry 147) may detect an uninstalled condition associated with the fall protection device based at least in part on the disconnected configuration detected by the controller 140.

In various embodiments, at least a portion of the controller 140, such as, for example, at least a portion of the materials handling vehicle control circuitry 145 and/or the processor 142 may be at least substantially integrated with the circuitry of the materials handling vehicle itself. For example, in various embodiments, one or more signals generated by the controller 140 (e.g., from the materials handling vehicle control circuitry 145, the communications circuitry 144, and/or the processor 142) in association with a connection condition may comprise a lead signal that may be received by the materials handling vehicle circuitry (e.g., controls) and configured to cause the materials handling vehicle 10 to be controlled and/or operated in accordance with the lead signal. As a further example, in various embodiments, one or more signals generated by the controller 140 (e.g., from the materials handling vehicle control circuitry 145, the communications circuitry 144, and/or the processor 142) in association with a connection condition may comprise a slave signal that may be generated in response to one or more signals received from the materials handling vehicle circuitry (e.g., controls). Additionally, or alternatively, in such an exemplary system architecture wherein the controller 140 is configured to generate a slave signal that is received by the materials handling vehicle (e.g., controls), the slave signal may comprise a passive and/or informative data signal that is not configured to directly cause a reactive operation and/or action by the by the materials handling vehicle circuitry, but rather may be configured for processing by the materials handling vehicle, which may be configured to generate a reactionary signal based at least in part on the data contained in the slave signal.

In various embodiments, the processor 142 may be configured to communicate with the image processing circuitry 146. The image processing circuitry 146 may be a device and/or circuitry embodied in either hardware or a combination of hardware and software that is configured to receive, process, generate, and/or transmit data (e.g., imaging data), such as one or more images, videos, and/or the like captured by a first sensing device (e.g., an imaging device 130 as illustrated in the exemplary mounting device 100 of FIG. 3). In various embodiments, the image processing circuitry 146 may be further configured to analyze the one or more images captured by the imaging device using at least one processing technique to determine one or more characteristics of a connection condition as defined by a connection configuration and/or a disconnected configuration associated with the fall protection device as captured in the sensor data (e.g., imaging data, device movement data) captured by the first and second sensing elements of the mounting device 100.

In various embodiments, the image processing circuitry 146 may send and/or receive imaging data captured by the imaging device 130 and/or corresponding data associated therewith generated in a supported format by the image processing circuitry 146 to and/or from the imaging device data repository 107.

Further, in various embodiments, the image processing circuitry 146 may be configured to analyze imaging data comprising one or more images captured by the imaging device 130 of the mounting device 100 and/or a fall protection device (e.g., a webbing length portion) engaged with the device 100 to detect and/or characterize a change in one or more conditions (e.g., positions, characteristics, configurations, and/or the like) between a first time and a second time, such as, for example, a movement (e.g., a micro-movement) and/or change in position of at least a portion of a webbing 21 provided within the webbing retention feature 123 of the extension arm 122 relative to the webbing retention feature 123, and/or the like. The image processing circuitry 146 may receive from the imaging device 130, for example, a first captured image and a second captured image, captured at the first time and the second time, respectively, wherein the second time is subsequent the first time (occurs after the first time). In such a configuration, the image processing circuitry 146 may be configured to distinguish between a first condition as defined in the first captured image and a second condition as defined in the second captured image by comparing the respective images captured at the first and second times and identifying any positions, characteristics, configurations, and/or conditions that were at least substantially different as defined in the second captured image.

In various embodiments, the processor 142 may be configured to communicate with the fall protection device connection condition detection circuitry 147. The fall protection device connection condition detection circuitry 147 may be a device and/or circuitry embodied in either hardware or a combination of hardware and software that is configured to receive, process, generate, and/or transmit data (e.g., sensor data), such as imaging data and/or device movement data captured by a mounting device 100 (e.g., via a first sensing device 130 and/or a second sensing device 150) and/or data corresponding thereto in order to detect the connection condition associated with a fall protection device relative to the operator attachment.

As described herein, in various embodiments, the fall protection device connection condition detection circuitry 147 may be configured to detect a connection condition associated with a fall protection device with respect to an operator attachment based at least in part on captured imaging data associated with a webbing portion of the fall protection device and captured device movement data associated with the mounting device (e.g., the mounting bracket and/or the rotary arm). In particular, as described herein, the fall protection device connection condition detection circuitry 147 may be configured to detect a connection condition defined by a connected configuration and/or a disconnected configuration of the attachment element of the fall protection device relative to the operator attachment. For example, the fall protection device connection condition detection circuitry 147 may be configured to at least facilitate a detection of a connection condition that is defined by a connected configuration of a fall protection device (e.g., an attachment element) relative to an operator attachment by determining that the fall protection device is in a connected configuration relative to the operator attachment during operation of the materials handling vehicle. The mounting device 100 may be configured to detect a connection condition defined by a connected configuration of the attachment element relative to the operator attachment based on first sensor data (e.g., imaging data captured by the first sensing device) corresponding to a movement condition defined by a movement of the webbing of a fall protection device relative to a webbing retention feature defined by the rotary arm, and second sensor data corresponding to any movement of the mounting bracket 100, including a linear movement of the mounting bracket (e.g., within an environment, as defined by a movement of the materials handling vehicle to which the mounting device 100 is secured) and/or a rotational movement of the rotary arm about the axis of rotation.

In various embodiments, the fall protection device connection condition detection circuitry 147 may be configured to at least facilitate a detection of a connection condition that is defined by a disconnected configuration of a fall protection device (e.g., an attachment element) relative to an operator attachment by determining that the fall protection device is in a disconnected configuration relative to the operator attachment during operation of the materials handling vehicle. For example, the fall protection device connection condition detection circuitry 147 may be configured to at least facilitate a detection of a disconnected configuration of the attachment element of the fall protection device relative to an operator attachment by determining that the portion of the webbing of the fall protection device disposed at the webbing retention feature of the rotary arm 120 defines a stationary condition during operation of the materials handling vehicle 10, such as, for example, at an instance in which the controller 140 detects one or more control signals associated with operator instructions to control/operate the materials handling vehicle, or a movement condition defined by the mounting device 100 based at least in part on sensor data captured by a second sensing device In various embodiments, the fall protection device connection condition detection circuitry 147 may be configured such that, upon detecting a connection condition defined by a disconnected configuration of the fall protection device (e.g., an attachment element) relative to an operator attachment, the fall protection device connection condition detection circuitry 147 may transmit at least one signal comprising a control signal configured to cause at least a portion of the operation functionalities of the materials handling vehicle to be suspended. For example, in such an exemplary circumstance, in various embodiments, the fall protection device connection condition detection circuitry 147 may transmit at least one signal comprising a control signal configured to cause the materials handling vehicle (e.g., the drive controls, the lift controls) to be shut down, thereby preventing the materials handling vehicle from being operated while the mounting device 100 detected a dangerous condition.

In various embodiments, the fall protection device connection condition detection circuitry 147 may be configured such that, upon detecting the connection configuration associated with the fall protection device relative to the operator attachment, the fall protection device connection condition detection circuitry 147 may transmit at least one signal and/or corresponding data (e.g., data indicative of the fall protection device being configured in a fully-installed configuration and/or in an uninstalled configuration) to one or more of the alert management circuitry 148, the input/output circuitry 143, and/or the imaging device data repository 107, such as, for example, in order to facilitate a determination of a connection condition.

In various embodiments, the processor 142 may be configured to communicate with the alert management circuitry 148. The alert management circuitry 148 may be a device or circuitry embodied in either hardware or a combination of hardware and software that is configured to, upon a connection condition associated with the fall protection device being detected by the exemplary mounting device 100, cause one or more alert signals corresponding to the detected connection condition to be transmitted from a connection condition indicator of mounting device 100. As described herein, the alert management circuitry 148 may facilitate transmission (e.g., emission, display, and/or any other perceivable means of signal communication) of an exemplary alert signal comprising an audio and/or visual signal corresponding to a detected connection condition that, upon being transmitted from the connection condition indicator, may embody a perceivable indication of the connection condition (e.g., a light, a sound, a message, and/or the like, or any combination thereof) and/or an instructional message corresponding to the detected connection condition. For example, the alert management circuitry 148 may generate an indicator signal corresponding to the detected connection condition and may cause the indicator signal to be transmitted to the connection condition indicator for transmission therefrom as one or more audio and/or visual alert signals embodying an indication of the connection condition detected by the mounting device 100.

In various embodiments, an exemplary mounting device 100 may be configured with, or in communication with, an imaging device data repository 107. The imaging device data repository 107 may be stored, at least partially on the memory 141 of the system. In some embodiments, the imaging device data repository 107 may be remote from, but in connection with, the mounting device 100. The imaging device data repository 107 may contain information, such as images relating to one or more materials handling vehicles (e.g., workspaces), fall protection devices, fastening/attachment means, webbing types, and/or the like. In some embodiments, the mounting device 100 may also use machine learning for detecting one or more conditions, configurations, and/or the like associated with a fall protection device in order to facilitate the detection of a connection condition associated with the fall protection device, such that the mounting device 100 may use a reference database, such as the imaging device data repository 107, to initially train the mounting device 100 and then may be configured to detect a connection condition without referencing the imaging device data repository 107 or other reference databases. For example, in various embodiments, a controller 140 may be configured to execute a feedback loop, wherein one or more imaging data, device movement data, corresponding connected configurations, and/or determined characteristics (e.g., characteristics associated with an operator, a fall protection device, and/or a materials handling vehicle) associated with the sensor data captured by the sensing devices may define one or more inputs into a machine learning model in order to increase a rate of machine learning associated with the one or more machine learning techniques, as described herein.

In various embodiments, although various operations described herein with respect to the mounting device (e.g., controller 140) may be described, illustrated, and/or otherwise disclosed for illustrative purposes as sequential operations executed in series, it should be understood that at least a portion of operations executed and/or facilitated by the mounting device 100 (e.g., controller 140) may comprise synchronous operations and/or communications that may be executed (e.g., by an exemplary mounting device 100) at least substantially simultaneously. For example, in various embodiments, a connection condition may be detected at an at least substantially singular instance based on a plurality of data outputs corresponding to a plurality of configurations relating to materials handling vehicles, fall protection devices, workspaces and/or operator configurations (e.g., positions, orientations, connections, and/or the like) as captured by an exemplary imaging device in association with at least substantially the same instance.

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A mounting device for a fall protection device, the mounting device comprising:

a mounting bracket configured for attachment to a materials handling vehicle; and a rotary arm rotatably attached to the mounting bracket at an arm base, wherein the rotary arm is configured to rotate relative to the mounting bracket about an axis of rotation defined at the arm base, wherein the rotary arm is rotatably attached to the mounting bracket via one or more fastening elements comprising a slip ring, wherein the rotary arm defines a webbing retention feature configured for receiving a webbing of the fall protection device to define a dynamic engagement of the rotary arm with an intermediate webbing portion defined along a length of the webbing, the webbing retention feature defining an extended webbing engagement point, and wherein the webbing retention feature is defined at a distal position along an extension arm of the rotary arm, and wherein a rotation of the rotary arm about the axis of rotation causes a corresponding rotation of the extended webbing engagement point about the axis of rotation.

2. The mounting device of claim 1, further comprising a first sensing device configured to capture a first sensor data associated with the intermediate webbing portion.

3. The mounting device of claim 2, further comprising a controller configured to detect a connection condition associated with the fall protection device based at least in part on the first sensor data captured by the first sensing device.

4. The mounting device of claim 1, wherein the rotary arm is configured to contact the intermediate webbing portion at the extended webbing engagement point to at least partially define an arrangement of the webbing relative to the mounting device.

5. The mounting device of claim 4, wherein the extension arm is rigidly secured to the arm base at a proximal arm end, the extension arm defining an arm length that extends from the proximal arm end in an outward radial direction to a distal arm end, wherein the outward radial direction being defined relative to the axis of rotation.

6. The mounting device of claim 5, wherein the rotary arm is configured to facilitate an extended range of motion for an operator relative to the fall protection device.

7. The mounting device of claim 1, wherein the rotary arm is configured for coupling with the fall protection device such that a body of the fall protection device is secured relative to the rotary arm, the rotary arm being configured for engagement with the fall protection device such that a rotation of the rotary arm about the axis of rotation causes a corresponding rotation of the fall protection device through a corresponding range of rotational motion.

8. The mounting device of claim 7, wherein the axis of rotation is defined by a central axis of the arm base, and wherein the rotary arm is configured for securing the body of the fall protection device relative to the arm base of the rotary arm such that the axis of rotation is defined at both the arm base and the fall protection device secured thereto.

9. The mounting device of claim 1, wherein the webbing retention feature defines an opening configured for the webbing of the fall protection device to be threaded therethrough such that at least a portion of the intermediate webbing portion is disposed within the opening.

10. The mounting device of claim 1, wherein the rotary arm is rotatably attached to an arm interface portion of the mounting bracket defining a downward-facing bottom surface such that the rotary arm is configured to define a position vertically below the mounting bracket upon the mounting bracket being secured relative to the materials handling vehicle, and wherein the axis of rotation is defined in a direction at least substantially perpendicular to the downward-facing bottom surface.

11. The mounting device of claim 2, wherein the first sensor data captured by the first sensing device is configured to facilitate a detection of a movement condition defined by one or more movements of the intermediate webbing portion relative to the webbing retention feature.

12. The mounting device of claim 11, wherein the first sensing device comprises an imaging device and the first sensor data is defined by imaging data comprising at least one image of the intermediate webbing portion.

13. The mounting device of claim 2, wherein the first sensing device is positioned at the webbing retention feature.

14. The mounting device of claim 3, wherein the connection condition associated with the fall protection device is defined by a detection of a connected configuration of the fall protection device relative to an operator attachment operatively secured to an operator.

15. A system comprising:

a material handling vehicle comprising a frame element and a platform, wherein the frame element is configured to secure a mounting device for a fall protection device to the material handling vehicle, and wherein the frame element is configured to move vertically with the platform during operation of the material handling vehicle; and the mounting device, wherein the mounting device comprises:

a mounting bracket configured for attachment to a materials handling vehicle; and a rotary arm rotatably attached to the mounting bracket at an arm base, wherein the rotary arm is configured to rotate relative to the mounting bracket about an axis of rotation defined at the arm base, wherein the rotary arm defines a webbing retention feature configured for receiving a webbing of the fall protection device to define a dynamic engagement of the rotary arm with an intermediate webbing portion defined along a length of the webbing, the webbing retention feature defining an extended webbing engagement point, and wherein the webbing retention feature is defined at a distal position along an extension arm of the rotary arm, and wherein a rotation of the rotary arm about the axis of rotation causes a corresponding rotation of the extended webbing engagement point about the axis of rotation.

16. The system of claim 15, wherein the fall protection device operably secures an operator wearing a harness to the frame element of the material handling vehicle.

17. The system of claim 16, wherein the fall protection device is secured to one or more anchor points of the harness worn by the operator.

18. The system of claim 15, wherein the frame element is positioned above a workspace defined by the material handling vehicle.

* * * * *